Aug. 1, 1939.  E. E. WYATT  2,167,791
COMBINED BUMPER AND LICENSE PLATE HOLDER
Filed Oct. 15, 1937
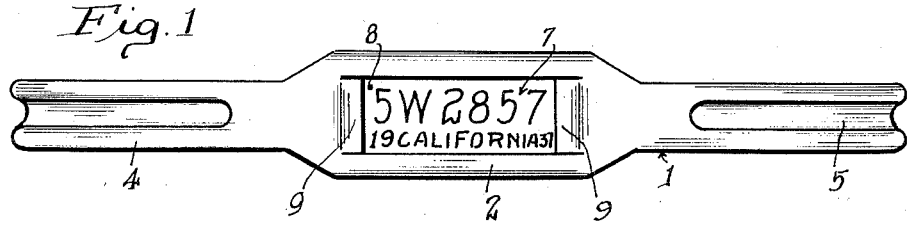
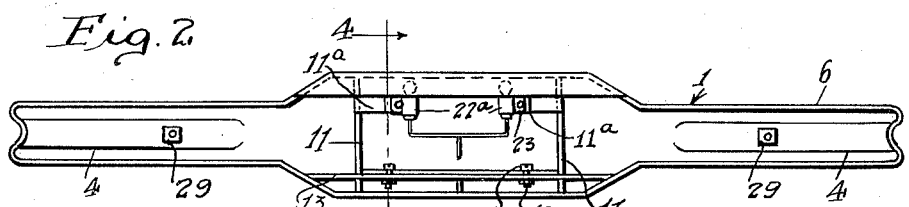
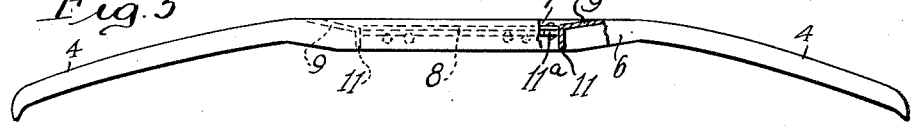
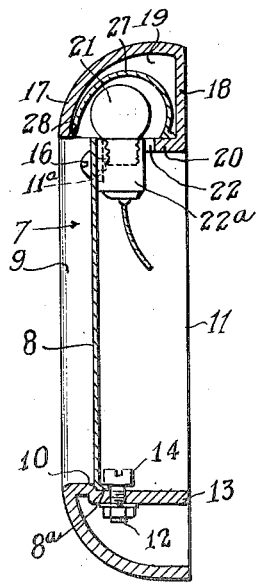
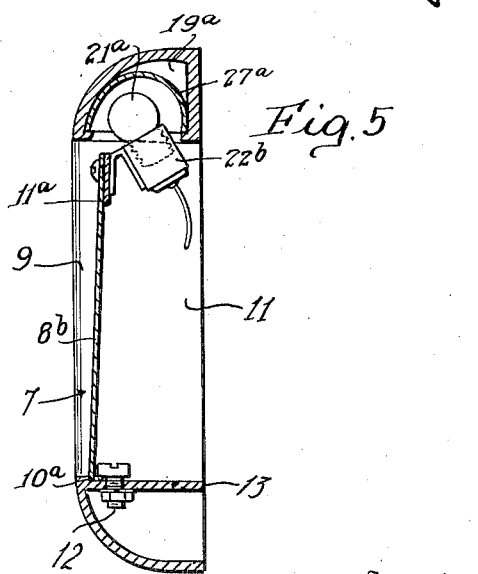
Inventor
Evan E. Wyatt
By Lyon & Lyon
Attorneys Patented Aug. 1, 1939

2,167,791

UNITED STATES PATENT OFFICE 2,167,791

COMBINED BUMPER AND LICENSE PLATE HOLDER

Evan E. Wyatt, Los Angeles, Calif.

Application October 15, 1937, Serial No. 169,147

9 Claims. (Cl. 40—130)

This invention relates to automobile bumpers and license plate holders. It is the usual practice to mount automobile license plates on separate brackets in such a way that at night the face of the license plate is illuminated by the tail lamp of the automobile. It has also been attempted to provide means for carrying a license plate on the automobile bumper, but in such constructions that have been brought to my knowledge, the license plate is mounted in such a way that it cannot be readily seen from the side. In other words, projecting portions of the bumper operate to screen the digits of the license plate that are located toward the ends of the plate.

The general object of this invention is to provide a construction in which a license plate can be carried in the bumper, and in a position to be protected by the bumper, and although carried within the bumper body, nevertheless the license plate is mounted in such a way that it can be plainly seen not only by an observer directly back of the car, but also by an observer located toward the side of the car.

A further object of the invention is to provide a construction of this kind in which the automobile bumper is provided with a lamp chamber in which a lamp or lamps may be readily mounted, the lamp chamber being so constructed that although it operates to house the lamp within it, it is capable of reflecting the rays from the light across the outer face of the license plate.

Further objects of the invention will appear hereinafter.

The invention consists in the novel parts and combination of parts to be described hereinafter, all of which contribute to produce an efficient combined bumper and license plate holder.

A preferred embodiment of the invention is described in the following specification, while the broad scope of the invention is pointed out in the appended claims.

In the drawing:

Fig. 1 is a front elevation of a bumper embodying my invention, illustrating a license plate carried within the same.

Fig. 2 is a rear elevation of the bumper and license plate illustrated in Fig. 1.

Fig. 3 is a plan of the bumper with a portion of the same broken away and shown in cross-section, to illustrate particularly the position of the license plate and the correlated features of construction of the bumper, which enable the license plate to be readily seen by an observer who is not directly in front of, or directly back of, the car.

Fig. 4 is a vertical section upon an enlarged scale taken about on the line 4—4 of Fig. 2, and passing through the lamp compartment and the license plate, and further illustrating details of the invention.

Fig. 5 is a vertical section similar to Fig. 4, illustrating a modified embodiment of the invention.

In practicing the invention, I provide a bumper 1, which may be constructed of sheet steel or similar material, said bumper consisting of an elongated bar presenting an outer face or faceplate 2 at its middle portion, which lies in a substantially vertical plane, and which is of increased depth as compared with the outer ends or arms 4 of the bumper. These ends 4 are preferably bent or curved inwardly toward the automobile, and the arms 4 may be provided with the longitudinal corrugation or groove 5 to increase their stiffness. The upper and lower edges of the arms 4 are preferably bent slightly toward the automobile that carries the bumper so as to form flanges 6. The outer face 2 of the bumper is formed with an opening 7 in which the license plate 8 is mounted. The plate is actually located within the body of the bumper (see Fig. 4) but only slightly removed from the outer face 2 of the bumper; and adjacent the ends of the license plate the outer face 2 is formed with depressions presenting long inclined faces 9 that extend toward the front of the bumper (see Figs. 1 and 3). The presence of these depressed faces 9 makes it possible for the outer face of the license plate to be readily seen by an observer standing out of line with the longitudinal axis of the car.

Any suitable means may be employed for securing the license plate in the opening of the bumper. For this purpose, however, I prefer to provide two license plate seats preferably including a lower seat 10 (see Fig. 4) which may be simply a narrow shoulder extending horizontally along the lower edge of the opening 7; the mounting means includes also, a pair of lugs 11a projecting laterally from two webs or bars 11 that extend vertically across the back of the bumper. In mounting the plate 8, its lower edge should be placed against the shoulder 10, and any suitable kind of fastening device such as screws or bolts 12, may be secured in the adjacent horizontal web 13 of the bumper. If desired, two of these screws or bolts can be employed. The sides of these bolts lie against the edge of a flange 8a formed at the lower edge of the plate 8, and the heads 14 of these bolts may overlap the flange (see Fig. 4).

At the seats or lugs 11a small machine screws 16 may be provided, seating in tapped openings in these lugs. (See Figs. 2 and 4.)

Any suitable means may be provided for illuminating the outer face of the license plate. However, I prefer to accomplish this by illuminating means mounted directly in the bumper body, and in a manner to be protected by the bumper body. In other words, the bumper body forms a housing for the electric lamp, or lamps, employed to illuminate the license plate. In order to accomplish this, I prefer to form the bumper with an outer wall 17 (see Fig. 4) which preferably extends upwardly and rearwardly on an incline or curve, and this wall preferably unites integrally with a vertical rear wall 18. In using the term "forward" or "rear" in connection with this bumper, it should be understood that these terms are used with reference to the face of the license plate. In other words, "toward the rear of the bumper", in referring to the rear bumper of an automobile, would indicate in a forward direction with respect to the direction in which the automobile faces.

These walls 17 and 18 cooperate to form a lamp chamber 19, which is nearly closed on the bottom by a substantially horizontal web 20 integral with the vertical wall 18. I prefer to mount the lamps 21 in this horizontal web 20. For this purpose the web is provided with openings 22 receiving lamp sockets 22a, and the lamps are constructed so as to be insertable in these lamp openings from below. In the present instance, each lamp socket is provided with a lug 23 or lugs at the side, secured by screws to the lugs 11. (See Fig. 2.)

By reason of the fact that the plane of the license plate 8 lies within the body of the bumper, the forward portion of the lamp chamber 19 extends forwardly of the license plate with respect to the forward face of the same. This is illustrated in Fig. 4. In order to cast rays from the lamps onto the face of the license plate, I prefer to provide a reflecting means preferably in the form of a metal shell 27 that is polished on its inner face. This metal shell forms an inner liner on the interior of the lamp chamber, and the forward end 28 of this shell terminates close to the upper edge of the opening and at the inner face of the outer wall 17 of the bumper.

With the construction described, it will be evident that rays from the lamp, or lamps, will be reflected in a downward direction across the outer face of the license plate.

Although I prefer to mount the lamps 21 adjacent the upper edge of the license plate, it is obvious that if desired, the construction illustrated in Fig. 4 could be used in an inverted position. However, I believe it is preferable to mount the lamps above the license plate.

In the modified embodiment illustrated in Fig. 5, the upper seat for the license plate is the forward faces of inclined lugs 11a corresponding to the lugs 11. They cooperate with a shoulder 10a like the shoulder 10, but displaced forwardly. This enables the license plate 8b to be held in a plane inclining toward the rear. And each lamp bulb 21a is carried in a socket 22b, the axis of which is inclined so that the bulb projects forwardly and upwardly approaching quite close to the part of the lamp chamber 19a that overhangs the upper edge of the license plate 8b enabling the reflector 27a to reflect a considerable amount of light down onto the license plate.

The inner side of the bumper on the arms 4 may be provided with any suitable means such as lugs indicated at 29, for securing the bumpers to the ends of the springs, or frame members, of the automobile.

It is understood that the embodiment of the invention described herein is only one of the many embodiments this invention may take, and I do not wish to be limited in the practice of the invention, nor in the claims, to the particular embodiment set forth.

What I claim is:

1. An automobile bumper having an opening in its outer face, a license plate with means for supporting the same within the body of the bumper at said opening and in a substantially vertical plane removed from the plane of the outer wall of the bumper, said bumper having a lamp chamber formed therein extending across one of the horizontal edges of the license plate, illuminating means mounted in the lamp chamber, and reflector means disposed in the lamp chamber and extending across the plane of the license plate so as to reflect rays from the illuminating means onto the outer face of the plate.

2. An automobile bumper having an outer wall with an opening therethrough, a license plate with means for supporting the same within the body of the bumper in said opening and in a substantially vertical plane removed from the plane of said outer wall, said outer wall extending rearwardly with respect to the license plate, an inner wall extending in a substantially vertical plane and cooperating with the outer wall to form a lamp chamber extending across a horizontal edge of the license plate, illuminating means carried in the lamp chamber, and a reflector associated with the illuminating means and extending across the plane of the license plate so as to reflect rays laterally onto the same.

3. An automobile bumper having a rear wall with an opening therethrough, a license plate with means for supporting the same within the body of the bumper at said opening, and in a substantially vertical plane removed from the plane of the outer wall, said outer wall adjacent the upper edge of the bumper extending upwardly and toward the rear with respect to the license plate and having a substantially vertical web extending downwardly from the first-named wall and cooperating with the same to form a lamp chamber, said bumper having a substantially horizontal web forming the bottom for said lamp chamber, with a lamp opening therein, a lamp socket mounted in said opening, a lamp insertable from below through said socket and extending up into said lamp chamber, said lamp chamber extending forwardly with respect to the face of the license plate and projecting forwardly beyond the plane of said plate, and reflecting means in said lamp chamber for reflecting the light from the lamp laterally down across the license plate.

4. An automobile bumper having a body with an outer wall having an opening therethrough for a license plate, said bumper having a substantially vertical license plate seat within said body and accessible through the said opening, a license plate secured to said seat, said outer wall extending upwardly and toward the rear with respect to the forward face of the license plate and having a substantially vertical inner wall integral with said outer wall, and a substantially horizontal web, said walls and said web cooperating to form a lamp chamber extending forwardly beyond the forward face of the license plate, a lamp mounted within the body of the bumper and insertable into the same from a point at the rear of the license plate, and reflecting means cooperating with the lamp to reflect light from the same laterally down across the forward face of the license plate.

5. An automobile bumper having an opening in its outer face, a license plate with means for supporting the same within the body of the bumper at said opening and in a substantially vertical plane removed from the plane of the outer wall of the bumper, said bumper having a lamp chamber formed therein extending across one of the horizontal edges of the license plate, illuminating means mounted in the lamp chamber, and reflector means disposed in the lamp chamber and extending across the plane of the license plate so as to reflect rays from the illuminating means onto the outer face of the plate, the said outer face having depressions in the same adjacent the ends of the license plate to increase the visibility of the license plate to an observer standing out of line with the longitudinal axis of the automobile.

6. An automobile bumper having an outer wall with an opening therethrough, a license plate with means for supporting the same within the body of the bumper in said opening and in a substantially vertical plane removed from the plane of said outer wall, said outer wall extending rearwardly with respect to the license plate, an inner wall extending in a substantially vertical plane and cooperating with the outer wall to form a lamp chamber extending across a horizontal edge of the license plate, illuminating means carried in the lamp chamber, and a reflector associated with the illuminating means and extending across the plane of the license plate so as to reflect rays laterally onto the same, the said outer wall having depressions in the same adjacent the ends of the license plate enabling the plate to be seen by an observer standing out of line with the longitudinal axis of the automobile.

7. An automobile bumper having a face-plate with an opening through the same, a license plate set back within the opening located in a plane inclined to the vertical plane, said bumper having a depressed outer face adjacent the ends of the license plate enabling the license plate to be seen by an observer located out of line with the longitudinal axis of the automobile, and means carried by the bumper behind the face-plate for illuminating the outer face of the license plate.

8. An automobile bumper having a face-plate, a license plate carried by the bumper in an inclined position, and illuminating means carried by the bumper behind the face-plate and beyond the horizontal upper edge thereof, said face-plate concealing the illuminating means from view.

9. An automobile bumper, a license plate carried thereby in an inclined position, and a lamp with a socket carried in the bumper above the plate, said socket operating to hold the lamp's axis in an inclined position and projecting forwardly and upwardly, and means for reflecting light from the lamp down onto the plate.

EVAN E. WYATT.